May 8, 1956 F. W. McRAE 2,744,719
QUICK-OPENING AND QUICK-CLOSING VALVE
Filed Aug. 16, 1952
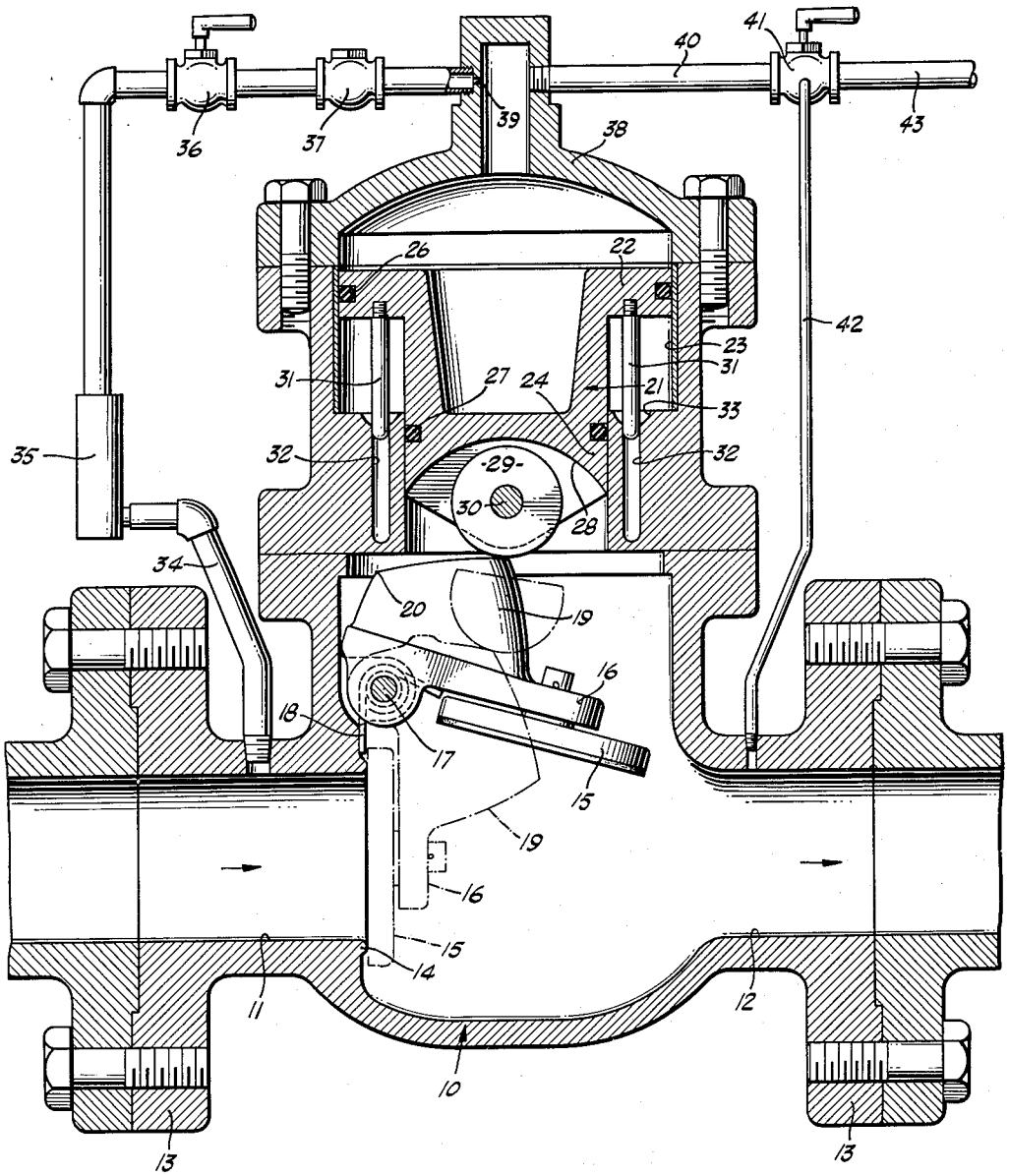
FRED W. McRAE
INVENTOR.
BY Hazard & Miller
ATTORNEYS

United States Patent Office 2,744,719
Patented May 8, 1956

2,744,719

QUICK-OPENING AND QUICK-CLOSING VALVE

Fred W. McRae, Los Angeles, Calif.

Application August 16, 1952, Serial No. 304,706

4 Claims. (Cl. 251—62)

This invention relates to a quick-opening and quick-closing valve.

Heretofore, valves of this general character have been devised consisting essentially of a body having an inlet and an outlet with a valve seat therebetween. A flap-type closure has been hingedly mounted with the body adapted to engage the valve seat and which, when opened, will be swung laterally to occupy a position entirely out of the path of fluid flow through the body or substantially so that flow may take place through the body with a minimum interference or modification by the valve closure when the valve closure was in open position. When the valve is used as a quick-opening valve it is normally in closed position against its seat and is required to arrest the flow of fluid which may be under a relatively high pressure. It is desirable to be able to hold the flap-type valve firmly pressed against its seat under such circumstances until the valve is allowed to open.

In the case of a quick-closing valve, the valve closure is in normally open position and when it is required to shut off the fluid flow passing through the body it is likewise desirable to swing the closure into the path of the flow with great mechanical advantage and to press the closure firmly against its seat with great mechanical advantage so that it may arrest the flow of the fluid which may be under relatively high pressure.

A primary object of the present invention is to provide a valve structure that may be used either as a quick-opening valve or as a quick-closing valve which is so designed that when the closure is forced towards its seat or held in seated position that a maximum mechanical advantage commensurate with a small and relatively compact structure is available.

Another object of the invention is to provide a construction having the above-mentioned characteristics and wherein the line pressure can be utilized to force the closure towards its seat and retain it against its seat.

With the foregoing and other objects in view which will be made manifest in the following detailed description and specifically pointed out in the appended claims, reference is had to the accompanying drawings for an illustrative embodiment of the invention, wherein:

Figure 1 is a longitudinal vertical section through a valve embodying the present invention.

Referring to the accompanying drawing wherein similar reference characters designate similar parts throughout, the valve consists of a body 10 having an inlet 11 and an outlet 12. These are preferably surrounded by flanges 13 applicable between companion flanges which may be on the conduit or pipe line in which the valve is incorporated. Within the body between the inlet and outlet there is a valve seat 14 and adjacent this valve seat there is swingably mounted a flap-type valve closure, the closure being indicated at 15, which is loosely mounted on an arm 16. The arm 16, in turn, is swingably mounted on a transversely extending pintle 17 that extends transversely of the housing. A torsion spring 18 is disposed about the pintle and normally urges the valve closure into open position.

On the back of the arm and extending at right angles to the axis of the pintle 17 there is a cam 19. This cam is generally angular in form and presents a high point 20.

The upper portion of the body 10 is so formed as to provide a cylinder for a differential piston 21, the upper portion of which indicated at 22 has the maximum diameter and is reciprocable within a line 23 or otherwise positioned within the upper portion of the body. The lower portion of the piston, indicated at 24, is of reduced diameter and is reciprocable within the lower portion of the upper body part. O-rings or the equivalent, indicated at 26 and 27, provide effective seals on the upper and lower portions of the piston. The lower portion 24 is diametrically grooved or recessed as indicated at 28 to receive a roller 29 that is rotatably mounted on a transversely extending pin 30. One or more pins 31 are secured to the upper portion 22 of the piston and extend downwardly into recesses 32 formed in the upper body part. The function of these pins is merely to retain the piston 21 against rotation. These pins may fit relatively loosely in their respective recesses 32 and preferably the shoulder at the division point between the upper and lower portions of the cylinder for the differential piston is grooved with an annular groove 33 in which air or gas entrapped between this shoulder and the upper portion 22 of the piston may be compressed whenever the piston is forcibly caused to descend.

A tubing 34 is connected to the body 10 upstream with respect to the valve seat 14. This tubing may lead through a filter 35 and through a manually operable valve 36 and a check valve 37 to the interior of the cap 38 on top of the body 10. Preferably, the cap is so formed as to provide a small orifice 39 through which the upstream pressure may be conducted to the top of the piston 21. When line pressure is thus conducted to the top of the piston 21 due to the large exposed area on its upper side, the piston will be forced downwardly despite the fact that the lower portion or reduced portion 24 is also exposed to line pressure. When the piston is forced downwardly its roller 29 engages the cam 19 and forces the closure 15—16 toward the seat 14. This forcing movement continues with constantly decreasing mechanical advantage until the high point 20 is traversed. This occurs just prior to the closure 15 engaging the seat 14 and as the roller passes over the high point 20 it is effective with considerable mechanical advantage to cause the closure to swing against its seat. As shown upon the drawing the surface of the cam 19 which is to the right of the high point 20 is arranged approximately horizontal or approximately at right angles to the direction of movement of the differential piston 21 when the valve closure is in its fully open position. That portion of the surface of the cam 19 which is to the left of the high point 20 is arranged at approximately right angles to the direction of movement of the piston 21 when the valve closure approaches its seating position, as indicated by dotted lines on the figure. Consequently, when the roller 29 passes over the high point 20 as the closure approaches its seating position and when the forces exerted on the closure by the pressure in the inlet and by the pressure in the cylinder are the greatest the reactionary forces imposed on the piston 21 tending to push the piston against one side of its cylinder are minimized when the valve is almost closed. Consequently, if the valve is used as a quick-closing valve, the mere opening of the valve 36 will cause pressure to be quickly supplied to the top of the piston and cause the closure 15 to be forced against its seat with considerable pressure. This pressure is more than adequate to arrest flow through the inlet 11 even though this flow may be at a relatively high pressure.

The interior of the cap 38 is also connected to a tubing 40 leading to a four-way valve 41. This four-way valve may be optionally employed to close the tubing 40 or to connect it to an outlet tubing 42 that leads to the body 10 downstream of the valve seat 14 or to connect the tubing 40 to a conduit 43. This conduit may lead to any one of a number of different devices that are sensitive to the occurrence of specified events. Thus for example, the conduit 43 may have attached thereto a number of thermo-sensitive devices adapted to open the conduit 43 whenever temperature becomes excessive. Whenever the pressure within the tubing 40 is released, either by being connected to the outlet tubing 42 or by being connected to the conduit 43 and having the conduit 43 opened in one manner or another the pressure that is effective on the upper portion 22 of the differential piston is released. Under these circumstances, line pressure within the body 10 is effective on the under side of the reduced portion 24 to lift the piston 21 and allow the spring 18 to swing the valve closure into open position. In this manner, it will be appreciated that if the valve is initially in open position and it is desired to quickly close it, it is merely necessary to close the valve 41 and open the valve 36. Line pressure is then effective to force the piston downwardly and to close the closure 15 tightly against its seat 14.

On the other hand, if the valve is used as a quick-opening valve the closure 15 is normally seated against the seat 14. The piston 21 is urged downwardly to maintain the valve closure in this position by the line pressure that is supplied to the top of the piston. The opening of conduit 43, if the tubing 40 is connected thereto, will suddenly release the pressure effective on the piston 21 allowing the piston to rise and allowing the valve closure to open. Similarly, if the valve 41 connects the outlet tubing 42 to the tubing 40 a similar release of pressure effective on the piston 21 will occur. The relieved pressure is not instantly rebuilt even though the valve 36 is open due to the retarding effect of the small orifice 39.

From the above-described construction it will be appreciated that when the valve closure is in open position it occupies a position outside of the line of flow through the valve so that it has little, if any, retarding effect on the fluid flowing therethrough. If the valve is a quick-closing valve, the supplying of pressure to the piston 21 causes the piston to be forced downwardly and as the closure 15 approaches its seat 14, the forces exerted by the piston on the valve closure tending to seat it will have an adequate mechanical advantage due to the roller 29 passing over the high point 20 on the cam. If the valve is used as a quick-opening valve the closure is maintained in its seated position quite tightly by the piston and by the fact that the roller has passed over the high point 20 of the cam. A quick release of pressure effective on the piston enables the closure to instantly open.

It will be appreciated by those skilled in the art there that is herein disclosed a means for forcibly closing a valve of the swing-check type as distinguished from the globe-type valve. Swing-check valves are advantageous in that the flapper or closure of the valve in open position permits of free flow through the valve body without interference or retardation which is highly advantageous over the globe-type in that the latter, due to its inherent construction, involves changes in direction of flow and frictional resistance which, in turn, involves volume and/or pressure loss.

Various changes may be made in the details of construction without departing from the spirit and scope of the invention as defined by the appended claims.

I claim:

1. A valve comprising a body having an inlet and an outlet arranged substantially in alignment with each other, a transversely arranged valve seat therebetween, a closure swingably mounted in the body adapted to seat upon the valve seat, a cylinder on the body, a piston reciprocable in the cylinder in a direction substantially parallel to the valve seat, a cam on the back of the closure, means on the piston engageable with the cam for forcing the closure into seating position upon the valve seat, said cam having a high point thereon traversed by said means as the closure approaches seating position, the surface on the cam engaged by said means on one side of the high point being arranged at approximately right angles to the direction of movement of the piston when the closure is in fully open position, and the surface of the cam on the other side of the high point engaged by said means being arranged at approximately right angles to the direction of movement of the piston when the closure approaches its seated position whereby reactionary forces on the piston tending to urge it against one side of the cylinder as the closure approaches its seated position are minimized, and means for admitting and releasing pressure to and from the cylinder.

2. A valve comprising a body having an inlet and an outlet arranged substantially in alignment with each other, a transversely arranged valve seat therebetween, a closure swingably mounted in the body adapted to seat upon the valve seat, a cylinder on the body, a piston reciprocable in the cylinder in a direction substantially parallel to the valve seat, a cam on the back of the closure, means on the piston engageable with the cam for forcing the closure into seating position upon the valve seat, said cam having a high point thereon traversed by said means as the closure approaches seating position, the surface on the cam engaged by said means on one side of the high point being arranged at approximately right angles to the direction of movement of the piston when the closure is in fully open position, and the surface of the cam on the other side of the high point engaged by said means being arranged at approximately right angles to the direction of movement of the piston when the closure approaches its seated position whereby reactionary forces on the piston tending to urge it against one side of the cylinder as the closure approaches its seated position are minimized, said piston being a differential piston having its smaller end exposed to pressure in the body.

3. A valve comprising a body having an inlet and an outlet arranged substantially in alignment with each other, a transversely arranged valve seat therebetween, a closure swingably mounted in the body adapted to seat upon the valve seat, a cylinder on the body, a piston reciprocable in the cylinder in a direction substantially parallel to the valve seat, a cam on the back of the closure, means on the piston engageable with the cam for forcing the closure into seating position upon the valve seat, said cam having a high point thereon traversed by said means as the closure approaches seating position, the surface on the cam engaged by said means on one side of the high point being arranged at approximately right angles to the direction of movement of the piston when the closure is in fully open position, and the surface of the cam on the other side of the high point engaged by said means being arranged at approximately right angles to the direction of movement of the piston when the closure approaches its seated position whereby reactionary forces on the piston tending to urge it against one side of the cylinder as the closure approaches its seated position are minimized, the means on said piston which engages the cam being a roller rotatably mounted on the piston, and means for holding the piston against rotation in the cylinder during its reciprocation.

4. A valve comprising a body having an inlet and an outlet arranged substantially in alignment with each other, a transversely arranged valve seat therebetween, a closure swingably mounted in the body adapted to seat upon the valve seat, a cylinder on the body, a piston reciprocable in the cylinder in a direction substantially parallel to the valve seat, a cam on the back of the closure, means on the piston engageable with the cam for forcing the closure into seating position upon the valve seat, said cam having a high point thereon traversed by said means as the closure approaches seating position, the surface on the cam engaged by said means on one side of the high point being arranged at approximately right angles to the direction of movement of the piston when the closure is in fully open position, and the surface of the cam on the other side of the high point engaged by said means being arranged at approximately right angles to the direction of movement of the piston when the closure approaches its seated position whereby reactionary forces on the piston tending to urge it against one side of the cylinder as the closure approaches its seated position are minimized, said piston being a differential piston having its smaller end exposed to pressure in the body, the means on said piston which engages the cam being a roller rotatably mounted on the piston, and means for holding the piston against rotation in the cylinder during its reciprocation.

References Cited in the file of this patent

UNITED STATES PATENTS

| | | |
|---|---|---|
| 668,202 | Nethery | Feb. 19, 1901 |
| 971,802 | Tanner | Oct. 4, 1910 |
| 1,513,424 | Richards | Oct. 28, 1924 |
| 2,146,878 | Arbogast | Feb. 14, 1939 |
| 2,356,990 | Getz | Aug. 29, 1944 |
| 2,384,627 | Krone | Sept. 11, 1945 |
| 2,389,661 | Fischer | Nov. 27, 1945 |
| 2,445,163 | Williamson | July 13, 1948 |

FOREIGN PATENTS

| | | |
|---|---|---|
| 590,737 | France | 1925 |
| 898,395 | France | 1944 |
| 647,978 | Germany | 1937 |
| 236,825 | Switzerland | 1945 |